United States Patent [19]

Susa et al.

[11] 4,317,668
[45] Mar. 2, 1982

[54] METHOD FOR PRODUCING SILICA GLASS

[75] Inventors: Kenzo Susa, Hinodemachi; Iwao Matsuyama, Sagamihara; Shin Satoh, Iruma; Tsuneo Suganuma, Tokorozawa, all of Japan

[73] Assignee: Hitachi, Ltd., Tokyo, Japan

[21] Appl. No.: 226,876

[22] Filed: Jan. 21, 1981

[30] Foreign Application Priority Data

Jan. 21, 1980 [JP] Japan .................................. 55-4600

[51] Int. Cl.³ ...................... C03B 19/06; C01B 33/12
[52] U.S. Cl. ............................................. 65/29; 65/32; 65/30.1; 264/332; 423/338; 501/12; 501/54
[58] Field of Search ................. 423/338; 65/DIG. 14, 65/30 R; 106/52, 50, 47 Q; 65/29, 32

[56] References Cited

U.S. PATENT DOCUMENTS

| | | | |
|---|---|---|---|
| 4,116,657 | 9/1978 | Elmer | 65/30.1 X |
| 4,165,223 | 8/1979 | Powers | 65/32 |
| 4,243,422 | 1/1981 | Lenz et al. | 106/52 |

FOREIGN PATENT DOCUMENTS

| | | | |
|---|---|---|---|
| 51-34219 | 3/1976 | Japan . | |
| 51-48797 | 4/1976 | Japan | 423/338 |
| 53-137086 | 11/1978 | Japan . | |

OTHER PUBLICATIONS

Yamane, M. et al., "Low Temperature Synthesis of a Monolithic Silica Glass by the Pyrolysis of a Silica Gel", J. Material Sciences 14 (1979), pp. 607–611.
Pastor, R. C. et al., "Crystal Growth in a Reactive Atmosphere", Mat. Res. Bull. 10 (1975), pp. 117–124.

*Primary Examiner*—Helen M. McCarthy
*Attorney, Agent, or Firm*—Birch, Stewart, Kolasch & Birch

[57] ABSTRACT

A method for producing silica glass wherein a dry silica gel subjected to a water desorption treatment and a carbon removal treatment is heated and has its temperature raised in an atmosphere containing chlorine, to perform a hydroxyl group removal treatment, the resultant silica gel is thereafter heated to a temperature of approximately 1,000° C.–1,100° C. in an atmosphere containing at least 1% of oxygen, to perform a chlorine removal treatment, and the resultant silica gel is further heated to a temperature of 1,050° C.–1,300° C. in He or in vacuum, to perform a sintering treatment. The silica glass thus produced does not form bubbles even when heated to high temperatures of or above 1,300° C. Therefore, it is easily worked and it is free from the lowering of transparency attributed to the bubble formation.

16 Claims, 3 Drawing Figures

METHOD FOR PRODUCING SILICA GLASS

BACKGROUND OF THE INVENTION

The present invention relates to a method for producing silica glass, particularly silica glass for optical instruments such as optical fiber, by heat-treating porous silica glass, particularly silica gel obtained through the hydrolytic reaction of a starting liquid material.

Hereunder, the background of the present invention will be described by using optical fibers as an example.

Optical fibers are used as a media for various kinds of optical transmissions ranging from optical transmissions of very short distances such as for example in a gastro-camera fiberscope, etc. to optical transmissions of long distances such as are used in optical communication systems. Optical fibers are mainly made of high-silica glass of high purity (if necessary, a dopant is utilized in the glass for adjusting the refractive index thereof).

As methods for producing such optical fibers, there have heretofore been known (i) a method in which a starting material which is molten in a crucible is turned into fiber, (ii) a method in which a high-silica glass film is formed on the inner wall of a silica tube by the CVD process (Chemical Vapor Deposition Process), the tube is collapsed, and the resultant rod is drawn out at a high temperature into a fiber, (iii) a method in which glass soot is prepared by the CVD process, and is piled up and thereafter sintered, and the sintered compact mass is drawn out at a high temperature into a fiber, and the like.

However, these prior art methods are disadvantageous for the following reasons. In case (i), it is difficult to obtain glass having a high silica composition, and the purification of the starting material is difficult because of the inevitable contamination from the crucible, so that optical fibers of high purity are hard to obtain. In case (ii), the mass-producibility is low, a large-sized mother rod is difficult to prepare, and multicomponent glass (glass containing a considerable amount of Na) cannot be produced. Moreover, since a thermal oxidation reaction is utilized, the yield is low when P, Ge, B or the like is used as a dopant element. In addition, the manufacturing equipment is expensive. Also in case (iii), multicomponent glass cannot be produced, the mass-producibility is low, and the manufacturing equipment is expensive. Furthermore, in any of the above cases (i), (ii), or (iii), a glass body in any desired shape cannot be formed. In addition, since both methods (ii) and (iii) produce silicon oxide via the high temperature state and method (i) melts glass sufficiently at high temperature, a high cost is ordinarily unavoidable.

On the other hand, a method capable of producing porous glass at a temperature which is not very high is known. This method is such that alkoxysilanes, or alkoxysilanes to which alkoxides have been added are hydrolyzed to obtain silica gels, or high-silica gels containing the additive oxides.

Further, it has been disclosed that the porous glass made from the silica gel obtained by the hydrolysis of the alkoxysilane can have its temperature raised gradually and heated at 1,000° C. or above in an oxidizing atmosphere, to achieve the desorption of water, the removal of residual organic substances and sintering, thereby turning the porous glass into dense glass (refer to, for example, the official gazette of Japanese Patent Application Laid-open Specification No. 51-34219 and M. Yamane et al.; *Journal of Materials Science*, vol. 14 (1979), pages 607–611). With such a method, the elimination of the difficulties of the prior art discussed in paragraphs (i), (ii) and (iii) above, can be expected.

However, the dense glass produced by heating the porous glass often forms bubbles when heating it at a high temperature of about 1,300° C. or above in order to work it. Accordingly, the usage of the glass has become extremely limited. In the case of manufacturing optical fiber by employing, as a mother rod, the high-silica glass produced by the above method, when the mother rod is heated to a high temperature in order to turn it into fiber, it forms bubbles and thus is often incapable of providing optical fibers.

Such bubble formation at high temperatures is considered to be caused by residual water, residual OH groups or any other gas component present in the sintered silica glass.

As a method which effectively removes the residual water from porous high-silica glass, there has been known a method in which the glass is exposed to a chlorine-containing atmosphere at a high temperature of 600° C.–1,000° C. and is thereafter sintered at 1,200° C.–1,300° C. (refer to the official gazette of Japanese Patent Application Publication No. 42-23036). According to the inventors' experimental study of this method, the bubble formation in the case of working the porous glass at high temperatures decreased remarkably but could not be completely prevented. At high temperatures of or above 1,300° C., the bubble formation was often noted.

The state of the art is represented by the following references:

(i) The official gazette of Japanese Patent Application Publication Specification No. 42-23036,
(ii) The official gazette of Japanese Patent Application Laid-open Specification No. 51-34219,
(iii) The official gazette of Japanese Patent Application Laid-open Specification No. 53-137086 and
(iv) M. Yamane et al.: *Journal of Materials Science*, vol. 14 (1979), pages 607–611.

SUMMARY OF THE INVENTION

An object of the present invention is to eliminate the difficulty of the prior art in the high-temperature working of high-silica glass obtained through the sintering of porous silica glass, and to provide a method for producing silica glass which does not form bubbles, even at high temperatures.

Another object of the present invention is to provide a method for readily producing silica glass which does not form bubbles, even at high temperatures.

A further object of the present invention is to provide a method for readily producing a high-silica glass material which serves as a mother rod for producing optical fibers from a dry silica gel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In order to accomplish the above objects, a method for producing silica glass according to the present invention comprises the steps of:

(i) heating a silica material made of a dry silica gel and raising its temperature to approximately 250° C. so as to remove adsorbed water;

(ii) heating the silica material with the water having been desorbed, and raising its temperature to approximately 700° C. in an oxidizing atmosphere so as to remove carbon;

(iii) heating the silica material with the carbon removed and raising its temperature from approximately 700° C. to a value within a range of about 1,000° to 1,050° C. in an atmosphere containing at least 1% by volume of $Cl_2$, so as to remove the hydroxyl groups, (iv) heating the silica material with the hydroxyl groups removed to a temperature of about 1,000° to 1,100° C. in an atmosphere containing at least 1% by volume of oxygen and holding said silica material at a predetermined temperature for at most 2 hours so as to remove chlorine, and (v) heating the silica material with the chlorine removed to a temperature of about 1,050° to 1,300° C. in He or in a vacuum and holding said silica material at a predetermined temperature for at most 1 hour so as to sinter it.

DETAILED DESCRIPTION OF THE INVENTION

It is desirable that the heating in step (i) is carried out at a temperature increasing rate of 20° C./hr. to 300° C./hr. and that the heating at or near 100° C. is especially at a low rate of 50° C./hr. or less. If necessary, the silica material can be held at or near 100° C. for at most 1 hour. The atmosphere in this step may be an oxidizing gas such as $O_2$ and air, an inert or neutral gas such as Ar, He and $N_2$, or a vacuum, and the gas should preferably be of high purity. More desirably, the temperature raising rate is 20° C./hr. to 200° C./hr., and the silica material is held at or near 100° C. for about 30 minutes to 1 hour. Especially in case of employing the dry gel which has been stored in the air for a long time, the silica material needs to be held at approximately 100° C. for a fixed time. However, this is unnecessary in the case of employing a gel having little adsorbed water. The atmosphere should more desirably be $O_2$, thereby relating to the atmosphere in step (ii). The best result is obtained by utilizing a gel which has been stored in an oven or dryer at 70° C. to 100° C. and has its temperature raised to 250° C. at a temperature which is increased at a rate of about 100° C./hr. to 200° C./hr. In this case, the holding of the temperature at approximately 100° C. is substituted by the initial storage at about 70° C. to 100° C. When the temperature raising rate exceeds the range specified above, unfavorably the dry gel is more likely to crack. On the other hand, when the temperature increase is below the above range, the required period of heating time is long, which is uneconomical. The reason why the holding of the silica material at or near 100° C. is effective is that during the temperature increase, the desorption of water is especially intensified at or near 100° C. Since the desorption of water at or near 100° C. lowers within about 1 hour or so, the temperature is further increased in order to effect the further desorption of water. The atmosphere in the step (i) is made to be either oxidizing, inert or a neutral gas having as low a $H_2O$ content as possible. This is intended to prevent the re-adsorption of moisture and to promote water removal.

Methods for producing the dry gel for use in step (i) of the present invention are described in detail in (a) the specification of a patent application, the principal inventors of which are the same inventors of the present invention, and which has already been filed in Japan as Japanese Patent Application No. 54-3957 and which has also been filed in the U.S.A., Britain, West Germany, France, Holland and Canada, claiming the appropriate priority; and (b) the specifications of patent applications, the inventors of which are the same as those of the present invention, and which have already been filed in Japan as Japanese Patent Application No. 54-150082, Japanese Patent Application No. 54-169335, Japanese Patent Application No. 55-95755 and Japanese patent application No. 55-95758 with corresponding applications having been filed in the U.S.A. and Europe (European Patent Application the designated countries of which are Britain, West Germany, France and Holland), claiming the appropriate priority. The methods for producing the dry gel are outlined as comprising the steps of (1) adding water to an alkoxysilane expressed by a general formula $Si(OR)_4$ (where R denotes an alkyl group) and further adding alcohol to form a sol (the mixed solution becomes a sol with the lapse of time, but as defined herein the mixed solution before becoming a sol shall also be considered as a "sol"), (2) putting the sol into a vessel having a predetermined shape, (3) letting the vessel stand and hydrolyzing the sol into a gel, and (4) slowly drying the gel into the dry gel.

The prior inventions disclosed in the specifications of the aforecited patent applications are now pending, and thus are not prior art.

In step (1), it is sometimes the case that an acid is added in order to promote the reaction and that an alkali is added in order to increase the porosity of the gel. When silica glass doped with an oxide is to be produced as, for example, in the case where glass having a refractive index different from that of pure silica is desired, the material $Si(OR)_4$ in the step (1) is replaced with $Si(OR)_4$ to which an alkoxide of a desired dopant element is added. Desirably, the temperature of the gelation in the step (3) is 10° to 120° C., and the drying temperature in the step (4) is 50° to 120° C. The drying speed in step (4) is set so that the rate at which the weight decreases is at most 40%/day. The dry gel to be used in step (i) is not restricted to those produced by the manufacturing methods described above, but may be produced by any method. The treatment in step (i) is to remove water adsorbed in the pores of the dry gel, and it can therefore be called a "water desorption treatment."

The purpose of the treatment in step (ii) is to remove organic substances remaining in the gel and carbon produced by the decomposition of such substances. Since the substances are finally removed in the form of oxides of carbon, the treatment is termed a "carbon removal treatment." Since the decarbonization effect appears in a temperature range of 250° C. to 700° C., the heating temperature is raised up to 700° C. The temperature raising rate is about 20° to 600° C./hr., more preferably about 30° to 300° C./hr. If necessary, the silica material can be held at approximately 700° C. for at most 1 hour. The atmosphere is an oxidizing atmosphere, which is usually pure oxygen, an inert or neutral gas containing at least 1% by volume of oxygen, air or the like. This atmosphere may contain $H_2O$ as well. When the temperature raising rate is above the aforecited range, the tendency of the silica material to crack undesirably increases, whereas when the temperature increasing rate is below said range, a long heating time is required which is not economical. The maintaining of the silica material at near 700° C. for a fixed time is intended to effect the removal of the residual organic substances and the decomposition products thereof more completely, and thus it may be omitted in many cases. Advantageously, the atmosphere is pure oxygen, or a high-purity inert gas or neutral gas containing at least 1% by volume of oxygen, for example, He containing oxygen. The above atmosphere is provided with the intent of further reducing the adsorbates. As the diameter of the pores in the silica material becomes larger, the rate of removal of the impurities is increased, and hence, the temperature raising rate can be made higher.

The treatment in step (iii) is for substantially removing $H_2O$ or hydroxyl groups still remaining in the silica material having undergone the treatment of steps (i) and (ii), thereby preventing the formation of bubbles due to the presence of water at high temperatures. This step is called the "hydroxyl group removal treatment" step. In the case where the produced silica glass is turned into fiber so as to form optical fibers for communication systems, the removal of the hydroxyl groups by step (iii) is remarkably contributive to the reduction of transmission loss. The temperature raising rate in this step is about 30° to 100° C./hr., more preferably 50° to 60° C./hr. The atmosphere is a gas containing at least 1% by volume of $Cl_2$, a chloride gas, and, in fact, $SiCl_4$, for example, may well be used instead of $Cl_2$. It is also possible to replace $Cl_2$ with a gas which is adapted to generate $Cl_2$ upon thermal decomposition, for example, $SOCl_3$ and $CCl_4$. As the gas to be mixed therewith, there can be employed an inert or neutral gas, oxygen or the like. A more preferable atmosphere is $O_2$ gas containing about 5 to 50% by volume of $Cl_2$. When the temperature raising rate is above the desired range, the OH removal becomes nonuniform between the central part and the peripheral part of the silica material and the tendency toward cracking increases. On the other hand, when the temperature raising rate is below the desired range, a long time is required for the heating which is not economical. When the content of $Cl_2$ in the atmosphere is less than 1% by volume, a satisfactory effect in removing the hydroxyl groups cannot be expected. The atmosphere may be pure chlorine as well. The lower limit of the temperature range of the hydroxyl group removal treatment by the chlorine-containing atmosphere is approximately 700° C. The atmosphere is caused to contain chlorine at approximately 700° C., and thereafter has its temperature raised at a predetermined rate. The temperature at which the present treatment is completed is about 1,000° to 1,050° C., preferably 1,000° C. When the atmosphere contains chlorine at temperatures below about 700° C., the effect of removing the hydroxyl groups is slight, and at temperatures above about 1,050° C., the amount of chlorine contained in the silica material becomes excessive and the silica material tends to crack, so that both the temperatures above and below the specified range are undesirable. The silica material is held in the chlorine-containing atmosphere at about 700° to 1,050° C. for at most about 2 hours at least once, as may be needed. By holding the silica material at the predetermined temperature, all of the silica material will have the hydroxyl groups uniformly removed. Usually, when the holding time exceeds about 2 hours, the tendency to lower the hydroxyl group content in the silica material becomes saturated, and hence it is uneconomical to set the holding time above about 2 hours. The time in which the saturation begins is somewhat different depending upon the size, properties etc. of the gel. When the silica material is held at about 900° C. for 1 to 2 hours and is further held at 1,000° C. for 1 to 2 hours, a more favorable result is obtained.

As previously stated, it has been the actual situation that even when the porous silica material is exposed to the chlorine-containing atmosphere at high temperatures and has the hydroxyl groups or water sufficiently removed, in many cases the silica glass obtained by sintering the treated silica material at 1,200° to 1,300° C. forms bubbles at high temperatures of 1,300° C. or above. To the end of preventing undesirable bubble formation, in the method for producing silica glass according to the present invention, the step of heat-treating the silica material in an atmosphere containing oxygen step (iv) is inserted between step (iii) and the sintering step (v). As a result of experimental study, it has been determined that the bubbles formed when the silica glass, heat-treated in the chlorine-containing atmosphere to remove the hydroxyl groups as in step (iii), is heated to or above 1,300° C., said bubbles are made of a gas whose principal constituent is $SiCl_4$. Regarding this fact, it is believed that Cl substitutes for the OH groups in the hydroxyl group removal step and that bonds of Si-Cl thus develop in large numbers. Accordingly, the reason why the bubble formation is prevented by the insertion of step (iv) is that the chlorine-based gas, forming the cause for bubble formation, is driven out of the silica material by heat-treating the material in an oxidizable atmosphere at a temperature of about 1,000° C. or above. Thus, step (iv) can be called the "chlorine removal treatment", which is a step not seen at all in the prior art.

In step (iv), the atmosphere contains at least 1% by volume of oxygen gas, ordinarily $O_2$, although $O_3$ may also be used. As a gas to be mixed therewith, an inert or neutral gas is usually used, and it should not contain water. A more preferable atmosphere is He containing at least 5% by volume of oxygen, or pure oxygen. When the oxygen content is less than 1% by volume, the chlorine-removing effect is insufficient. Although a gas containing water is effective for the chlorine removal treatment, the hydroxyl group content in the silica material increases because the OH groups are substituted for Cl. The heat-treating temperature in the step (iv) is about 1,000° to 1,100° C. preferably about 1,050° to 1,100° C., and the period of time at which the silica material is held at a predetermined temperature is at most about 2 hours, more preferably about 1 to 2 hours. When the heat-treating temperature is below about 1,000° C., the chlorine removing effect is slight. The chlorine removing effect is higher at a higher heat-treating temperature. However, when the chlorine removal treatment is conducted at a temperature above the transition point of glass, oxygen gas is confined in closed pores and causes the bubble formation. Therefore, the upper limit of the heat-treating temperature has been established at 1,100° C. Usually, when the holding time is in excess of about 2 hours, the chlorine removal effect exhibits a tendency to saturation, and hence, it is uneconomical when the holding time exceeds about 2 hours. The time in which the saturation begins is somewhat different depending upon the size, properties, etc. of the gel. When, in step (iv), it is necessary to raise the temperature, the temperature raising rate is 50° to 100° C./hr. When the temperature raising rate is above this range, undesirable cracks tend to occur in the silica material, whereas when it is below this range, a long heating time is required which is not economical.

Step (v) is a treatment which collapses the pores of the porous silica material and sinters the material. The treating temperature is about 1,050° to 1,300° C. Advantageously, the atmosphere is He, but it may be a vacuum as well. The period of time for which the silica material is held at a predetermined temperature is at most about 1 hour. When, in this step, it is necessary to raise the temperature, it is executed at a rate of about 50° to 100° C./hr., preferably 50° C./hr. An appropriate treating temperature or the upper limit of the treating temperatures varies depending upon the size of the pores of the particular silica material. When the pores are larger, the appropriate treating temperature shifts to the higher temperature side, but a temperature of at most 1,300° C. is sufficient. When the treating temperature is less than 1,050° C., the sintering is insufficient. Up to about 1 hour is usually sufficient as the period of time for which the silica material is held at a predetermined temperature, and no special advantage is achieved when the holding time exceeds 1 hour. In some cases, it is only required to raise the temperature within the treating temperature range with no holding time being required. The reasons for the restriction of the temperature raising are the same as in the case of the step (i).

It is desirable that the steps (i) to (v) are continuously performed without exposing the silica material to atmospheric air. The silica material handled in the producing method of the present invention is a substance whose specific surface area is very large. Therefore, when it is exposed to atmospheric air, moisture and various gases in the atmospheric air are adsorbed in large quantities. When a specimen having once adsorbed the moisture etc., has its temperature raised again and is subjected to the treatment of the next step, cracks frequently appear during the temperature raising process, or the adsorbed gases are confined within the pores of the specimen and thus are not sufficiently removed. With the presence of adsorbed gases confined within the pores, bubbles are formed during the sintering treatment of step (v), when the produced silica glass is heated to 1,300° C. or above. Particularly in the porous silica material subjected to the hydroxyl group removal treatment of step (iii), chlorine used in the atmosphere gas of step (iii) exists in the form in which it is substituted for the hydroxyl group, so that the surfaces of the pores are very active. Accordingly, when the specimen is exposed to atmospheric air, the surfaces of the pores disadvantageously react with the moisture in the atmospheric air whereby the concentration of hydroxyl groups in the specimen again increases. The porous silica material subjected to the chlorine removal treatment in step (iv) is in a favorable condition when moisture, hydroxyl groups, chlorine etc. have been sufficiently removed. When this favorable silica material is taken out into the atmospheric air, it adsorbs moisture from the atmospheric air onto the surfaces of the pores. When the silica material having adsorbed this moisture is sintered by step (v), it becomes silica glass with the moisture confined therein, and bubbles are formed during the sintering treatment in an extreme case. Thus, when the produced silica glass is heated to or above 1,300° C. for working etc., bubble formation is possible.

Furthermore, when the porous silica material having completed step (ii) is exposed to atmospheric air, the undesirable phenomena thought to be caused by the adsorption of moisture, for example, the occurrence of cracks, take place in the subsequent steps. Accordingly, it is desirable to continuously perform steps (i) to (v) without exposure to atmospheric air. Especially steps (iii), (iv) and (v) should be continuously performed without exposing the specimen to atmospheric air. However, it is very desirable to continuously perform steps (ii) and (iii).

All of the steps (i), (ii), (iii) and (iv) above stated have the ranges of the appropriate treatment conditions specified and may be processed within said ranges. The most appropriate treatment conditions are determined from both a qualitative and economical viewpoint, occasionally being determined by trial and error experimentation.

An expedient which permits the present invention to be readily performed under appropriate treatment conditions will now be described. According to the present invention, in at least one of the steps (i), (ii), (iii) and (iv), the quantity of at least one gas constituting an exhaust gas is measured, and the measured value of the quantity of the gas is fed back to the treating condition in the particular step so as to control and regulate this step. Advantageously other steps of the process can be controlled in this manner, and it is particularly desirable to control all four steps. More specifically, (1) in step (i), the $H_2O$ content in the exhaust gas is measured, and the temperature raising rate is controlled in accordance with the measured value; (2) in step (ii), the $O_2$ content, the HCOOH content, the $H_2O$ content or the $CO_2$ content in the exhaust gas is measured, and the temperature raising rate is controlled in accordance with the measured value; (3) in step (iii), the HOCl content or the HCl content in the exhaust gas is measured, and the hydroxyl group removal treatment is ended in accordance with the observations of the measured gas; and (4) in step (iv), the $Cl_2$ content in the exhaust gas is measured, and the chlorine removal treatment is ended in accordance with the observed values of the chlorine content of the exhaust gas.

The silica glass manufactured by the method for producing silica glass according to the present invention as stated above forms no bu-ble and can be readily worked as predetermined even when heated to a high temperature of 1,300° C. or above. Since the silica glass is quite free from the degradation of the transparency due to the bubble formation, it is suitable for use in optical instruments. Furthermore, it is particularly suitable as a mother rod for optical fibers because the residual OH content is very low. In addition, the manufacture of the silica glass is very easy.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DESCRIPTION OF THE PREFERRED EMBODIMENTS

The following examples are given by way of illustration only and should not be considered in any way as limiting the scope of the present invention:

EXAMPLE 1

4.5 mols of $CH_3OH$ and 4 mols of $H_2O$ were added to 1 mol of $Si(OCH_3)_4$, and they were sufficiently mixed. The resultant solution (a sol) was put into a cylindrical vessel 8.5 mm in diameter and 250 mm in length to the extent of 80%, and it was converted to a gel by letting the vessel stand at 70° C., with the top of the vessel tightly closed by aluminum foil, silver foil or any other suitable cover. Since the gel in this state included therein large quantities of water and alcohol, a larger number of pinholes each having a diameter of about 1 mm were provided in the tightly secured top cover, whereby the water and alcohol were removed from within the gel very slowly by drying. This drying was carried out at 70° C. until the weight of the gel became approximately 1/5 of the initial value. The drying time was 7 days. By this treatment, the gel progressed to the state in which the alcohol and water were substantially removed. This gel is a dry gel (in the instant case, since its component is silica, the gel is a dry silica gel). The dry silica gel thus obtained had a size of approximately 4.3 mm in diameter and approximately 100 mm in length, a bulk density of approximately 1.0 gr/cm$^3$ and a specific surface area of 800 to 900 m$^2$/gr. The dry silica gel was stored in an oven or dryer at 70° to 100° C. until the water desorption treatment to be described below was conducted.

Figure 1:
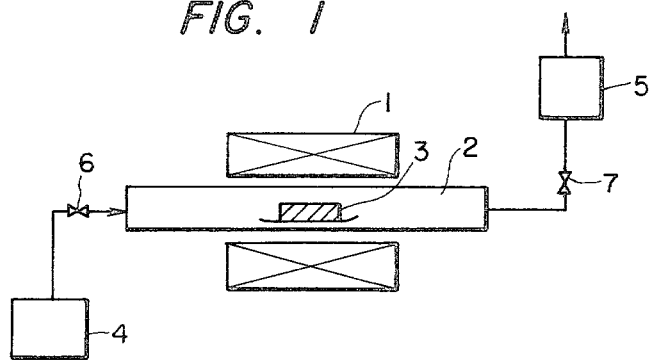
FIG. 1 is a schematic diagram showing the principal portions of a silica glass producing apparatus for use in the process of the present invention.

FIG. 1 is a schematic diagram showing the principal portions of an apparatus for producing silica glass from the dry gel of this example. The dry gel was arranged as a specimen 3 in the central part of a reaction tube 2 in an electric furnace 1 shown in FIG. 1. The inside diameter of the reaction tube 2 was 15 mm. First, oxygen gas ($O_2$) was introduced from a gas supply container 4 into the reaction tube 2 at a flow rate of 180 cc/min., and the exhaust gas was emitted into the atmosphere through an exhaust gas purifier 5. Elements 6 and 7 are gas cocks. Subsequently, while the oxygen gas was still flowing, the electric furnace 1 was energized, and the temperature was raised from room temperature to approximately 250° C. at a temperature increasing rate of 100° C./hr. Then, the water desorption treatment was completed. The temperature was continuously raised up to 700° C. at a temperature increasing rate of 100° C./hr. in the same oxygen gas stream, and the specimen was held at 700° C. for 30 minutes. Then, the carbon removal treatment was completed. Subsequently, in addition to the introduction of oxygen at 180 cc/min., chlorine ($Cl_2$) at a flow rate of 75 cc/min. was introduced from the gas supplying container 4 into the reaction tube 2 so as to bring the interior of the tube to an oxygen atmosphere containing 33% by volume of chlorine. The temperature was increased to 900° C. at a temperature raising rate of 50° C./hr., and was held at 900° C. for 2 hours. Furthermore, the temperature was raised to 1,000° C. at the same temperature raising rate of 50° C./hr. and was held at 1,000° C. for 1 hour. Then, the hydroxyl group removal treatment was completed. Subsequently, the supply of the chlorine gas was stopped at 1,000° C. While introducing only the oxygen gas into the reaction tube 2 at a flow rate of 180 cc/min., the temperature was raised up to 1,050° C. at a temperature raising rate of 50° C./hr. and was held at 1,050° C. for 1 hour. Then, the chlorine removal treatment was completed. After the completion of the chlorine removal treatment, the supply of oxygen gas was stopped at 1,050° C. While introducing helium gas (He) at a flow rate of 300 cc/min. into the reaction tube 2 instead of the oxygen gas, the temperature was raised up to 1,300° C. at a temperature raising rate of 50° C./hr. Then, the sintering treatment was completed. The electric furnace 1 was deenergized, and the specimen was cooled in the furnace while maintaining the flow of helium gas. The water desorption treatment and the subsequent steps described above were continuously performed, and the specimen was not taken out of the treatment environment.

The silica glass obtained was transparent, and did not include abnormalities such as cracks. When a sample of the specimen was removed and had its hydroxyl group concentration measured by the IR spectroscopy, the hydroxyl group concentration was found to be 7.4 ppm. Although the silica glass was heated to a high temperature of 1,300° C. or above to render it molten, abnormalities such as bubbles did not appear. When the silica glass was intensely heated with an oxyhydrogen burner, a very slight bubble formation was noted, which was considered to pose no problem in practical use. The Cl content of the specimen was 0.7 weight-%.

Reference Example 1

Silica glass was produced by the same processings as in Example 1 except that after the completion of the hydroxyl group removal treatment, the supply of the chlorine gas is stopped at 1,000° C. and that while introducing only helium gas into the reaction tube at a flow rate of 300 cc/min., the temperature was raised up to 1,300° C. at a temperature raising rate of 50° C./hr. In other words, that the chlorine removal treatment was omitted.

The silica glass obtained was transparent, and did not include abnormalities such as cracks. However, when it was heated at the high temperature of 1,300° C. or above, to be fused, a marked bubble formation was noted. The bubble was subjected to gas analysis, and was found to be made of a gas whose principal component was $SiCl_4$. In this manner, in the case where the step of the chlorine removal treatment is omitted, a favorable result is not attained.

Reference Example 2

Silica glass was produced by the same processing as in Example 1 with the exception that after the completion of the hydroxyl group removal treatment, the specimen was cooled down to the room temperature in a helium gas atmosphere in the furnace and was then taken out into atmospheric air at a relative humidity of 60%. After the specimen was permitted to stand for 1 hour, it was again arranged in the central part of the reaction tube 2, and that while introducing helium gas at a flow rate of 300 cc/min. into the reaction tube 2, the temperature was raised to 1,000° C. at a temperature which was increased at a rate of 300° C./hr. This experiment was conducted twice, and the specimens of the silica glass thus obtained were found to be opaque due to bubble formation in both cases.

Reference Example 3

Silica glass was produced by the same processing as in Example 1 with the exception that after the completion of the hydroxyl group removal treatment, the specimen was cooled down to room temperature in a helium gas atmosphere while it remained within the reaction tube in the electric furnace, and that after the specimen was held at room temperture in the helium gas atmosphere a whole day and night, it had its temperature raised up to 1,000° C. at a temperature raising rate of 300° C./hr. in the helium gas atmosphere.

The silica glass thus obtained was of excellent quality, similarly as the silica glass produced in Example 1.

It has accordingly been revealed that even when the specimen is cooled down to room temperature after the completion of the hydroxyl group removal treatment, an advantageous result is obtained unless the specimen is exposed to atmospheric air. However, such a treatment merely incurs an increase of the cost.

Reference Example 4

Silica glass was produced by the same processing as in Example 1 with the exception that after the completion of the carbon removal treatment, a specimen was cooled to room temperature in the furnace and was then exposed to atmospheric air at a relative humidity of 60%. After the specimen was permitted to stand for 1 hour, it was again arranged in the central part of the reaction tube 2 and that while introducing oxygen at a flow rate of 180 cc/min. into the reaction tube 2, the temperature was increased to 700° C. at a temperature raising rate of 300° C./hr. This experiment was conducted five times. The presence of cracks was noted in the specimens of the produced silica glass in two of the cases, but no abnormality was noted in the other three cases.

Accordingly, the silica material subjected to the carbon removal treatment should more desirably be continuously subjected to the next treatment step without being exposed to atmospheric air. When it is unavoidably required to separately store the specimen, the specimen is stored in, for example, a dry gas current, whereby the adsorption of water can be minimized.

EXAMPLE 2

Figure 2:
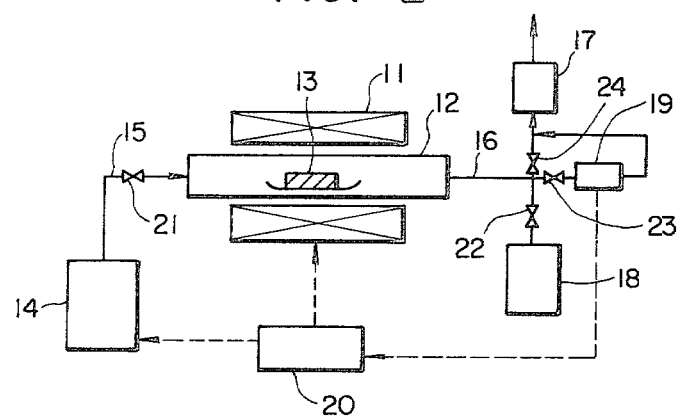
FIG. 2 is a schematic diagram showing the principal portions of a silica glass producing apparatus for use in another embodiment of the present invention.
Figure 3:
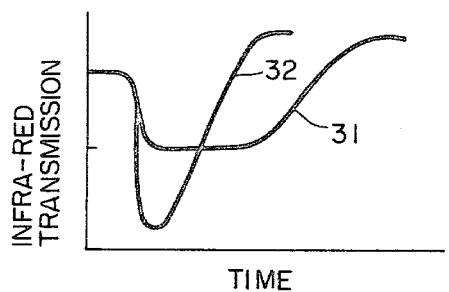
FIG. 3 is a graph showing the relationship between the infrared transmission corresponding to moisture in an emitted gas and the lapsed time after the initiation of raising the temperature in the water desorption treatment step.

FIG. 2 is a schematic diagram showing the principal portions of an apparatus for producing silica glass from a dry gel in the present example and Examples 3, 4 and 5 hereinbelow. A dry gel obtained in the same way as in Example 1 was arranged as a specimen 13 in the central part of a reaction tube 12 in an electric furnace 11, as shown in FIG. 2. The inside diameter of the reaction tube 12 was 15 mm. The dry gel so employed had been stored in air at room temperature, and had a size of approximately 4.3 mm in diameter and approximately 100 mm in length, a bulk density of approximately 1.0 gr/cm$^3$ and a specific surface area of 800 to 900 m$^2$/gr. First of all, oxygen was introduced from a gas supplying portion 14 into the reaction tube 12 at a flow rate of 200 cc/min., and the exhaust gas was emitted into the atmospheric air through an exhaust pipe 16 and an exhaust gas purifier 17. The gas was supplied from the gas supplying portion 14 to the reaction tube through an introduction pipe 15. Here, the flow rate of oxygen needs to be such that vaporized water is not condensed downstream of the reaction portion. The electric furnace 11 was energized, and while raising the temperature of the furnace from room temperature at a rate of about 300° C./hr., the infrared transmission of the exhaust gas was measured. Then, an infrared transmission factor corresponding to the vibration wave number of the water molecule, 3,600 cm$^{-1}$ began to abruptly decrease at a temperature near 100° C., and the temperature raising rate was lowered to 0° C./hr. (that is, the temperature was held near 100° C). Thereafter, the temperature raising rate was gradually increased or decreased so that the infrared transmission factor might hold at approximately 50%. The measurement of the infrared transmission was made with an infrared spectrometer installed on a gas composition analyzing portion 19. Since the infrared transmission began to rise from approximately 200° C. irrespective of the increase or decrease of the temperature raising rate, the temperature was again raised at the temperature raising rate of 300° C./hr. Then, the rise of the infrared transmission became unobserved at approximately 250° C., and the completion of the water desorption treatment was known. The above variation of the infrared transmission is shown at a curve 31 in FIG. 3. The axis of ordinates in FIG. 3 represents the infrared transmission, while the axis of abscissas represents the lapsed time after the initiation of the temperature raising, both the axes being of arbitrary units. When the specimen was taken out of the reaction tube 12 and examined, abnormalities such as cracks were not noted.

For comparison sake, the same dry gel had its temperature raised from room temperature of 250° C. at a fixed temperature raising rate of approximately 300° C./hr. in an oxygen gas stream at a flow rate of 200 cc/min., and the variation of the infrared transmission was examined. A result as shown by curve 32 in FIG. 3 was obtained. When this comparative specimen was taken out of the reaction tube and examined, cracks in several places were observed.

As is apparent from the example, the water content in the exhaust gas is detected and this information is fed back to the temperature raising rate, whereby the water desorption treatment can be readily controlled and reliably completed. Although, in the example, a manual control was made, it is apparent that the reproducibility is further enhanced by making an automatic program control. In this case, a detection signal issued from the infrared spectrometer in the gas composition analyzing portion 19 is transmitted to a program controller 20 and is fed back to a furnace temperature control in accordance with a program. In FIG. 2, numeral 18 indicates a vacuum pump which is used in the case of heat-treating the specimen in vacuum, and elements 21, 22, 23 and 24 are gas cocks.

The subsequent steps were carried out in the same manner as in Example 1, to produce the silica glass. The silica glass obtained was of excellent quality similar to that of Example 1.

EXAMPLE 3

A specimen having completed the water desorption treatment in the same manner as in Example 2 had its temperature increased at a temperature raising rate of 100° C./hr. Then, an infrared transmission factor corresponding to HCOOH began to decrease suddenly at a temperature near 300° C., and the detection amount of HCOOH increased rapidly. Therefore, the temperature raising rate at 300 to 400° C. was regulated so that the infrared transmission factor might hold an approximately 50%. The measurement of the infrared transmission was made by means of an infrared spectrometer installed on the gas composition analyzing portion 19. The gas composition analyzing portion 19 was also provided with a mass filter, which was used simultaneously with the infrared spectrometer. The measurements of the quantities of reaction products in the exhaust gas were made on $H_2O$ and $CO_2$ similarly as on HCOOH as referred to above. From 400° C., the temperature was increased to 700° C. at a fixed rate of 100° C./hr. Both the infrared spectrometer and the mass filter indicated substantially the same results, and it was confirmed that the carbon removal treatment was substantially completed between 600° C. and 700° C. Thereafter, the specimen was taken from the reaction tube 12 and was examined, and abnormalities such as cracks were not noted.

The present example attained the favorable result by using the result of the gas analysis to control the temperature raising rate. However, in case where the gas to be introduced into the reaction tube 12 was a mixed gas consisting of oxygen and an inert or a neutral gas, a similar favorable result was obtained by using the results of the gas analysis to control the concentration of oxygen in the atmosphere gas.

In general, any organic compound remaining in the dry silica gel is oxidized and removed in any oxygen atmosphere at a temperature of 250° C. or above, and the reaction proceeds abruptly at near 300° C. Accordingly, in the case where the temperature is raised at a comparatively high rate, without controlling said rate, the specimen frequently becomes cracked or broken. The present example provides an expedient for preventing this drawback.

The subsequent steps were carried out similarly to those of Example 1, to produce silica glass. The silica glass obtained was of excellent quality, similarly as in Example 1.

EXAMPLE 4

A specimen having completed the carbon removal treatment in the same manner as in Example 3 was cooled down to room temperature in the oxygen atmosphere of the furnace. Thereafter, the temperature was raised from the room temperature to 700° C. at a rate of 300° C./hr. in an oxygen gas stream at a flow rate of 180 cc/min. At 700° C., in addition to the oxygen being supplied at 180 cc/min., chlorine at a flow rate of 75 cc/min. was introduced into the reaction tube 12 so as to bring the interior of the tube to an oxygen atmosphere containing 33% by volume of chlorine, whereupon the temperature was raised to 1,000° C. at a rate of 60° C./hr. When the exhaust gas to be emitted through the exhaust pipe 16 was analyzed by the mass filter installed on the gas composition analyzing portion 19, OHCl, HCl etc. were detected as reaction products. At first these products increased with a lapse of time. However, when the temperature was held constant at 1,000° C., the reaction products gradually decreased. After being held at 1,000° C. for about 1 hour, the reaction products became undetected, and thus the completion of the hydroxyl group removal treatment was determined.

Using another specimen having completed the carbon removal treatment in the same manner as in Example 3, the same experiment as described above was conducted. In this example, the holding time at 1,000° C. in which the reaction products such as HOCl, and HCl became undetected was 2.5 hours.

As can be understood from the above example, the circumstances surrounding the hydroxyl group removing reaction vary somewhat depending upon the particular specimens, but an effective removal of the hydroxyl groups is always achieved by monitoring the reaction products. In the case where the hydroxyl group removal is not effectively achieved, bubbles are formed in the silica glass in the subsequent sintering treatment, or the silica glass becomes unusable as a mother rod for optical fibers which requires a low content of hydroxyl groups in the silica glass. On the other hand, when the hydroxyl group removal becomes excessive, the content of chlorine in the silica glass increases, which causes the formation of cracks. Accordingly, it is desirable to perform the hydroxyl group removing treatment to a controlled extent, and the application of the method of the present invention as described in the present example is recommended therefor.

Silica glass was produced by carrying out the subsequent steps in the same way as in Example 1. The silica glass obtained was of excellent quality, similarly as in Example 1.

EXAMPLE 5

A specimen having completed the hydroxyl group removal treatment in the same manner as in Example 4 was not taken out into the atmospheric air, and the gas was changed to helium at a flow rate of 300 cc/min. at 1,000° C. While holding the temperature at 1,000° C., the concentrations of chlorine ($Cl_2$) gas and oxygen ($O_2$) gas were measured with the mass filter disposed in the gas composition analyzing portion 19. After 30 minutes, these gas concentrations lowered below detection sensitivities, and $SiCl_4$ was slightly detected. At this stage, the introduction of the helium gas was stopped, and oxygen at a flow rate of 180 cc/min. was introduced from the gas supplying portion 14 into the reaction tube 12 instead. The temperature was raised to 1,050° C. at a rate of 50° C./hr., and was held at this point. As a result, $Cl_2$ gas began to be detected in the mass filter. However, when the temperature was held at 1,050° C. for 1 hour, the $Cl_2$ gas concentration was reduced below the detection sensitivity. While holding the temperature at 1,050° C., the gas was changed-over from oxygen to helium gas at a flow rate of 300 cc/min. In 30 minutes after the change-over, the concentration of oxygen gas in the exhaust gas was reduced below detection sensitivity. At this time, the temperature was increased to 1,200° C. at a rate of 50° C./hr. with the helium gas atmosphere being maintained unchanged. After holding the temperature at 1,200° C. for 1 hour, the heating power source of the electric furnace 11 was turned off. The specimen was cooled down to room temperature in the furnace while the helium gas was maintained flowing, and it was then removed from the reaction tube 12 and investigated. The specimen was a transparent glass rod with no abnormalities such as cracks or bubbles being noted. A part of the specimen was cut to a thickness of approximately 2 mm and was polished, whereupon the quantity of hydroxyl groups contained in the specimen was measured by IR spectroscopy. The quantity of hydroxyl groups was below 10 ppm. When the transparent glass rod obtained was intensely heated and molten with an oxyhydrogen burner, abnormalities such as the formation of bubbles did not occur, and the rod could effectively be used as a mother glass rod for optical fibers.

EXAMPLE 6

Specimens of silica glass were produced in the same manner as in Example 1 except that in the chlorine removal treatment, temperatures at which the specimens were held in an oxygen stream for 1 hour were controlled at 980° C., 1,100° C. and 1,150° C. The specimens of the silica glass obtained were transparent, and did not include abnormalities such as cracks. However, when these specimens of silica glass were intensely heated with an oxyhydrogen burner (the reading of an optical pyrometer became approximately 1,500° C.), both the specimens held at 980° C. and at 1,150° C. formed bubbles and produced disadvantageous results, whereas the specimen held at 1,100° C. did not form a bubble and achieved favorable results. The contents of Cl in the specimens were 1.2 weight-%, 0.5 weight-% and 0.1 weight-% for the holding temperatures of 980° C., 1,100° C. and 1,150° C. in the chlorine removal treatment, respectively. Accordingly, in the case where the heat-treatment temperature at which the specimen is held in the oxygen stream for 1 hour is lower than 1,000° C., the chlorine removal effect is undesirably slight and the produced silica glass tends to form bubbles when heated to high temperatures. On the other hand, in the case where the heat-treatment temperature is 1,150° C. or so, that is, it exceeds approximately 1,100° C., the chlorine removal effect rises, but unfavorably the oxygen gas is confined in closed pores and the silica glass tends to form bubbles when heated to high temperatures.

Accordingly, the heat-treating temperature in the oxygen gas stream in the step of chlorine removal is about 1,000° to 1,100° C.

Obviously many modifications and variations of the present invention are possible in the light of the above teachings. It is therefore to be understood that within the scope of the appended claims the invention may be practiced otherwise than as specifically described.

What is claimed is:

1. A method for producing silica glass which comprises
   (i) subjecting a dry silica gel to a water desorption treatment,
   (ii) heating the resultant silica gel to effect a carbon removal treatment,
   (iii) increasing the temperature in a chlorine-containing atmosphere to effect a hydroxyl group removal treatment,
   (iv) further heating the resultant silica gel to a temperature of about 1,000° to 1,100° C. in an atmosphere other than air, containing at least 1% by volume of oxygen and the substantial remainder being a high purity inert or neutral gas that is moisture free to effect a chlorine removal treatment, and
   (v) further heating the resultant silica gel to a temperature of about 1,050° to 1,300° C. in a helium atmosphere or in a vacuum to effect a sintering treatment.

2. A method for producing silica glass which comprises
   (i) heating a silica material made of dry silica gel by raising the temperature to about 250° C. to effect a water desorption treatment,
   (ii) further heating the resultant silica material by raising the temperature to about 700° C. in an oxidizing atmosphere to effect a carbon removal treatment,
   (iii) further heating the resultant silica material by raising the temperature from about 700° C. to about 1,000° C. to 1,050° C. in an atmosphere containing at least 1% by volume of chlorine to effect a hydroxyl group removal treatment,
   (iv) further heating the resultant silica material to a temperature of about 1,000° to 1,100° C. in an atmosphere other than air, containing at least 1% by volume of oxygen and the substantial remainder being a high purity inert or neutral gas that is moisture free and holding said silica material at a predetermined temperature for up to 2 hours to effect a chlorine removal treatment, and
   (v) further heating the resultant silica material to a temperature of about 1,050° to 1,300° C. in a helium atmosphere or in a vacuum and holding said silica material at a predetermined temperature for up to 1 hour to effect a sintering treatment.

3. The method for producing silica glass as defined in claim 2, wherein the temperature is increased in step (iii) at a rate of 30° to 100° C./hr.

4. The method for producing silica glass as defined in claim 2, wherein the temperature is increased in step (iii) at a rate of 50° to 60° C./hr.

5. The method for producing silica glass as defined in claim 2, wherein the atmosphere in said step (iii) is a mixed gas consisting of 5 to 50% by volume of $Cl_2$ with the substantial balance being $O_2$.

6. The method for producing silica glass as defined in claim 2, wherein, in step (iii), the silica material is held at a predetermined temperature at least once for at most about 2 hours.

7. The method for producing silica glass as defined in claim 2, wherein, in step (iv), the silica material is held at the predetermined temperature of about 1,000° to 1,100° C. for 1 to 2 hours.

8. The method for producing silica glass as defined in claims 2, 3, 4, 5, 6 or 7, wherein the atmosphere in step (iv) is He containing at least 5% by volume of oxygen, or pure $O_2$.

9. The method for producing silica glass as defined in claims 2, 3, 4, 5, 6 or 7, wherein in step (v), the silica material has its temperature raised to the predetermined temperature at a rate of 50° to 100° C./hr.

10. The method for producing silica glass as defined in claim 2, wherein in steps (iii) and (iv), the silica material is subjected to the next subsequent step without being exposed to atmospheric air after the end of each of said steps.

11. The method for producing silica glass as defined in claim 2, wherein in said steps (ii), (iii) and (iv), the silica material is subjected to the next subsequent step without being exposed to atmospheric air after the end of each of said steps.

12. The method for producing silica glass as defined in claim 2, wherein in at least one of said steps (i), (ii), (iii) and (iv), the quantity of at least one gas constituting the exhaust gas is measured, said measured value of the gas quantity being used to control the treatment condition in said step.

13. The method for producing silica glass as defined in claim 12, wherein in step (i), the quantity of $H_2O$ in the exhaust gas is measured, said measured value being used to control the rate at which the temperature is increased.

14. The method for producing silica glass as defined in claim 12, wherein, in step (ii), the quantity of $O_2$, the quantity of HCOOH, the quantity of $H_2O$ or the quantity of $CO_2$ in the exhaust gas is measured, said measured value being used to control the rate at which the temperature is increased.

15. The method for producing silica glass as defined in claim 12, wherein, in step (iii), the quantity of HOCl or the quantity of HCl in the exhaust gas is measured, said hydroxyl group removal treatment being ended when the measured gas is no longer observed.

16. The method for producing silica glass as defined in claim 12, wherein, in step (iv), the quantity of $Cl_2$ in the exhaust gas is measured, said chlorine removal treatment being ended when the quantity of $Cl_2$ is no longer observed.

* * * * *